United States Patent [19]

Venkataramani et al.

[11] Patent Number: 5,905,269

[45] Date of Patent: May 18, 1999

[54] ENHANCED INFRARED ENERGY REFLECTING COMPOSITION AND METHOD OF MANUFACTURE

[75] Inventors: Venkat Subramaniam Venkataramani, Clifton Park, N.Y.; Douglas Dwight Giese, Lousiville, Ky.

[73] Assignee: General Electric Company, Schenectady, N.Y.

[21] Appl. No.: 08/862,970

[22] Filed: May 23, 1997

[51] Int. Cl.⁶ .................................................. G01M 11/02
[52] U.S. Cl. .................... 250/504 R; 219/405; 359/589
[58] Field of Search .......................... 250/504 R, 493.1, 250/495.1; 427/167; 428/336; 359/589; 219/405, 411

[56] References Cited

U.S. PATENT DOCUMENTS

| | | | |
|---|---|---|---|
| 2,767,297 | 10/1956 | Benson | 219/35 |
| 3,304,406 | 2/1967 | King | 219/411 |
| 3,436,524 | 4/1969 | Pauls | 219/347 |
| 3,612,828 | 10/1971 | Siegla | 219/464 |
| 3,718,497 | 2/1973 | Rice | 117/35 R |
| 4,188,452 | 2/1980 | Groth . | |
| 4,345,143 | 8/1982 | Craig et al. | 219/411 |
| 4,455,479 | 6/1984 | Itoh et al. | 219/405 |
| 5,028,760 | 7/1991 | Okuyama | 392/435 |
| 5,058,196 | 10/1991 | Nakamura et al. | 392/435 |
| 5,270,550 | 12/1993 | Martorana et al. | 250/504 R |
| 5,276,763 | 1/1994 | Gobel et al. | 392/422 |
| 5,517,005 | 5/1996 | Westerberg et al. | 219/685 |

FOREIGN PATENT DOCUMENTS

| | | |
|---|---|---|
| 2175201 | 10/1973 | France . |
| 2367711 | 5/1978 | France . |
| 4126790 | 2/1993 | Germany . |
| 55-007586 | 1/1980 | Japan . |
| 59-17372 | 1/1984 | Japan . |
| 63-117928 | 5/1988 | Japan . |

*Primary Examiner*—Kiet T. Nguyen
*Attorney, Agent, or Firm*—Ernest G. Cusick; Noreen C. Johnson

[57] ABSTRACT

An infrared energy reflecting enamel composition comprises a ground coat of enamel on a substrate and embedded $TiO_2$ particles in the ground coat of enamel. The infrared reflecting enamel composition has an infrared energy reflectivity value of at least 80%. A method for manufacturing the composition is also disclosed for embedding the $TiO_2$ in the enamel.

21 Claims, 5 Drawing Sheets

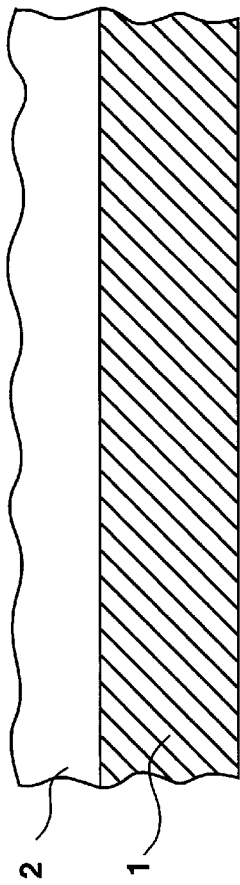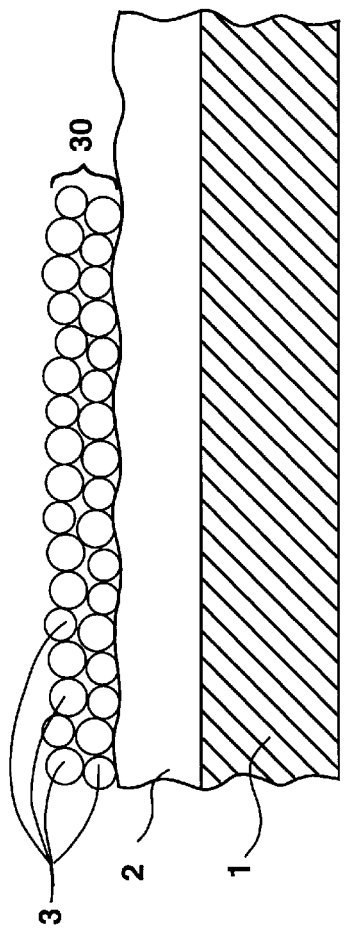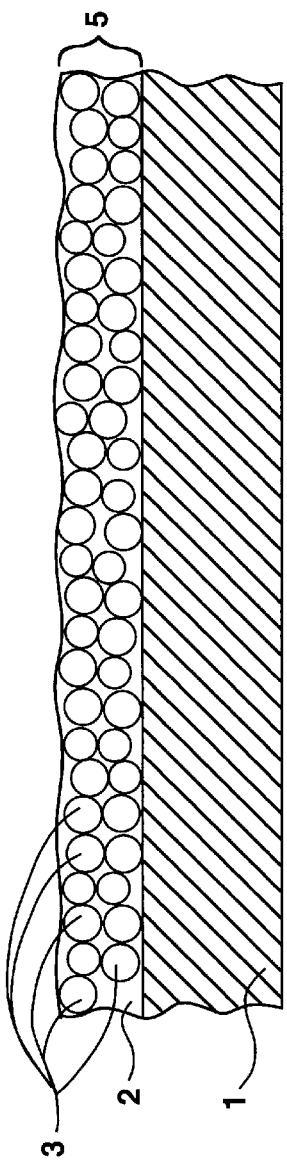

ENHANCED INFRARED ENERGY REFLECTING COMPOSITION AND METHOD OF MANUFACTURE

BACKGROUND OF THE INVENTION

1. Field of the Invention

This invention relates to enhanced reflectance infrared energy reflecting compositions for cooking apparatus.

2. Description of the Related Art

Ovens for cooking food have been known and used for thousands of years. One of the simplest and probably the oldest cooking of food resulted when food products were left next to a fire, perhaps on a hot rock, and cooked essentially by a heat transfer method of conduction. With refinement, an enclosure surrounding the heating element entrapped the heated air, giving rise to cooking by convective heat transfer. This process was the prototype for the modern gas or electric oven.

In the past century, radiant energy from energy radiation sources has been used to heat and directly cook foodstuffs. Within the past few decades, microwave ovens have become common, in which microwave radiation cooks the food. This has proved useful in allowing very short cooking times for many types of food.

Ovens using infrared energy sources, for example such as quartz halogen lamps, are used for quick heating of food. These quartz halogen lamp ovens can also be used for cooking, and are common in restaurants. In these ovens most of the heat is infrared energy. This infrared energy is reflected and a majority of the infrared energy is lost into the walls of the oven. The walls of these ovens do not reflect a sufficient amount of infrared energy cooking energy onto the food to be cooked to be an efficient user of energy.

Attempts have been made to line the inside of the quartz halogen lamp ovens with metallized coatings, which are often highly polished coatings. However, the highly polished surfaces cannot withstand the scrubbing and cleaning processes and materials to which ovens are subjected. The cleaning leads to a degradation of the polished metallized coating, and a subsequent reduction in the reflective efficiency of the oven.

Further, the metal reflective surfaces provide only a specular reflectance, and do not efficiently disperse and direct the infrared energy to the food to be heated. The specular reflectance by metallic surfaces provides a direct, "angle in equals angle out" type of reflectance. Thus, the specular reflectance merely reflects around the oven, without a substantial portion of the energy impinging on the food.

Specular reflection of energy from metallic surfaces for use in ovens is known, for example in U.S. Pat. Nos. 5,571,005 to Westerberg et al.; 3,304,406 to King; and 5,276,763 to Gobel et al. These ovens specularly reflect energy, which as discussed above, reflects around the oven, without necessarily all of the energy impinging on the food. The specular reflectance is not dispersed throughout the oven to impinge onto the food. Accordingly, specular reflectance of the infrared energy by polished metal surfaces of an oven is energy inefficient.

It was generally believed that radiation with wavelengths much shorter than 1 micron is not useful in cooking or baking processes, partly because of the weaker interaction of the shorter wavelengths with the foodstuff molecules in terms of general heat transfer, and partly due to the inferior penetrating properties of such radiation. In particular, it was believed that visible light, i.e., radiation with a wavelength in a range between about 0.4 to about 0.7 micron, was not very useful in the cooking process.

However, if a sufficiently intense source of visible light radiation is used with sufficient infrared energy radiation reflection onto the food, an effective cooking apparatus results. The combination of the deeply penetrating reflected infrared radiation and the intense visible radiation establishes a temperature gradient within the interior of the foodstuff that ensures that the surface temperature of the foodstuff is hotter than the interior, and the products of the cooking, i.e., the water vapor and gases like $CO_2$, are quickly driven to the surface and out of the foodstuff. This process results in a very rapid and efficient cooking of the food.

Using infrared radiation to cook food has a number of significant advantages. The cooking process is very fast. Bakery products, for example, can be baked 5 to 10 times faster than ovens that rely on conventional convection and conduction processes. The quality of the cooking process is enhanced for many foodstuffs. Vegetables are cooked so fast that they are virtually steamed in their own water vapor, leaving them hot, but with very little loss of any of their nutritive values.

The reflectance efficiency of a material composition is dependent on several factors. These factors include the particle size of the reflecting particles and the volume fraction or coverage over the surface of the material composition. An optimum particle size and volume fraction will optimize the reflectance in the desired wavelength. Thus, it is desirable to increase the particle size and increase the volume fraction so as to increase the reflectance of the material composition.

Enamels contain oxide particles, for example, white enamels Q0808A, XT1056-4, T1363 and XT 1032 of the Ferro Corporation all contain oxides. These enamels comprise a white enamel with Anatase $TiO_2$. However, as discussed above, these enamels are not acceptable infrared reflectors because the size and amount or volume fraction of the Anatase $TiO_2$ particles do not provide a sufficient degree of reflectance. Accordingly, even though these enamels contain Anatase $TiO_2$, they are not suitable for infrared heating, and there is a significant degree of energy loss.

SUMMARY OF THE INVENTION

Accordingly, it is desirable to provide a high reflective infrared reflecting enamel composition that overcomes the above described, and other, deficiencies. The high reflective infrared reflecting enamel composition effectively and efficiently reflects infrared energy, and is used in ovens that use infrared energy.

It is desirable to provide a high reflective infrared reflecting enamel composition comprises reflective oxide particles dispersed in a glassy enamel matrix, to reflect infrared energy and diffuse the infrared energy into food.

It is also desirable to provide a method for manufacturing a high reflective infrared energy reflecting enamel composition. The method comprises forming a ground coat of enamel on a substrate; providing a layer of titania powder on the ground coat, where the layer of titania powder contains $TiO_2$ particles; and heating the ground coat and the substrate, where the heating softens the ground coat forms a dense layer on the substrate and embeds the $TiO_2$ particles in the ground coat.

Additionally, it is desirable to provide a high reflective infrared reflecting enamel composition. The high reflective infrared energy reflecting enamel composition comprises a substrate; a ground coat of enamel provided on the substrate; and Rutile $TiO_2$ particles in the ground coat of enamel. The Rutile $TiO_2$ particles are embedded in the ground coat of enamel by heating the ground coat and the substrate. The infrared reflecting enamel composition has an infrared energy reflectance value of at least 80%.

According to another object of the invention, it is desirable to provide an oven comprising at least one infrared energy source; at least one internal surface; and a high reflective infrared reflecting enamel composition on at least one of said at least one internal surface. The high reflective infrared reflecting enamel composition comprises a ground coat of enamel provided on the at least one internal surface; and Rutile $TiO_2$ particles in the ground coat of enamel. The Rutile $TiO_2$ particles are embedded in the ground coat of enamel by heating the ground coat and the substrate. The infrared reflecting enamel composition has an infrared energy reflectance value of at least 80%.

BRIEF DESCRIPTION OF THE DRAWINGS

While the novel features of this invention are set forth in the following description, the invention will now be described from the following detailed description of the invention taken in conjunction with the drawings, in which:

FIG. 3 is side cross-sectional view of a substrate covered with a ground coat enamel composition;

FIG. 4 is a side cross-sectional view of FIG. 3 with a layer of titania powder thereon;

FIG. 5 is a side cross-sectional view of FIG. 4 after heat treating;

DETAILED DESCRIPTION OF THE EMBODIMENTS

A material's reflectance is dependent on several factors including size of reflecting particles, volume fraction or coverage of the reflecting particles over the surface of the material, and difference in the refractive index of the particles. An optimum size and volume fraction of the reflecting particles in the material will result in an optimum reflectance for the material in the desired wavelength ($\lambda$).

For example, an optimum size for reflecting particles is in a range between about $\frac{1}{3}(\lambda)$ to about $\frac{1}{2}(\lambda)$ of a desired radiation and an optimum volume is in a range between about 15% to about 40%. Thus, it is desirable to increase the reflecting particle size to an optimum size to a range between about $\frac{1}{3}(\lambda)$ to about $\frac{1}{2}(\lambda)$ for a desired radiation and enlarge the volume fraction of the reflecting particles to a range between about 15% to about 40%, so as to increase the reflectance of the enamel composition.

Reflecting particles in an enamel composition typically are high reflective infrared reflecting metal oxide particles. Metal oxides, for example such as titanium oxide ($TiO_2$), zinc oxide (ZnO), zirconium oxide ($ZrO_2$), antimony oxide ($Sb_2O_3$) and compounds thereof, are effective high reflective infrared reflecting metal oxide particles, since these particles possess an optimum size, in a range between about $\frac{1}{3}(\lambda)$ to about $\frac{1}{2}(\lambda)$ for desired infrared radiation, and an enlarged volume of high reflective infrared reflecting metal oxide particles, in a range between about 15% to about 40%, when in an enamel composition as embodied in the invention. However, the above list of high reflective infrared reflecting metal oxide materials is merely exemplary and is not meant to limit the invention in any way. The invention is intended to cover other high reflective infrared reflecting metal oxide materials that reflect infrared energy.

The above high reflective infrared reflecting metal oxides and their compounds (hereinafter the metal oxides) are especially effective reflectors for infrared energy with a wavelength in a range between about 0.1 to about 5.0 $\mu$m, which are wavelengths emitted by infrared energy sources commonly used in rapid cooking ovens. Further, high reflective infrared reflecting metal oxide particles reflect and disperse the infrared energy, so as to efficiently and effectively heat food in an infrared oven, i.e., above about at least an 80% reflectance value.

The infrared energy sources for infrared ovens include, but are not limited to, lamps, such as quartz halogen lamps. In the following description, the food will be referred to as heated. However, the description is also applicable to food that is to be cooked.

Figure 1:
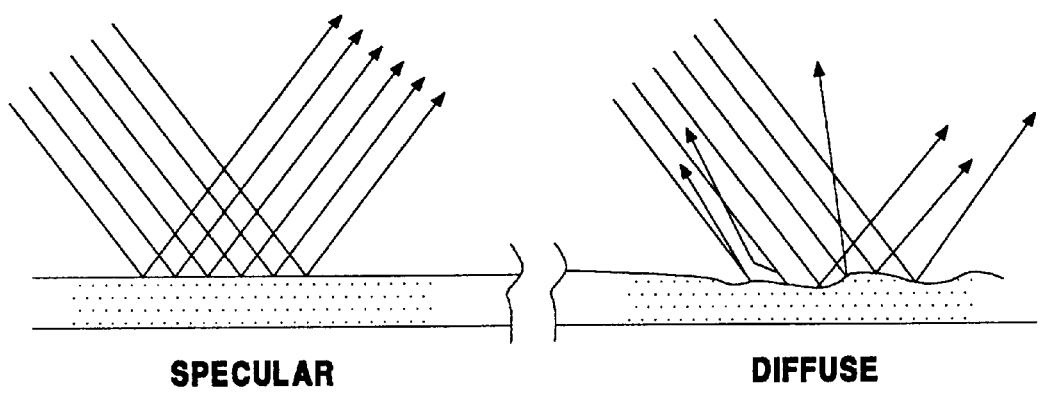
FIG. 1 is an illustration of specular versus diffuse reflectance.

High reflective infrared reflecting metal oxide particles are incorporated in the enamel composition to reflect infrared energy. However, in addition to reflecting the infrared energy, the high reflective infrared reflecting metal oxide particles also disperse the infrared energy, compared to the direct "angle in equals angle out" specular reflectance. Thus, the resulting infrared energy reflectance is a dispersion of infrared energy throughout the oven, and thus impinging on the food from mostly all angles. The difference in specular versus diffuse reflection is illustrated in FIG. 1.

To avoid a waste of energy, and consequentially a waste of resources as a result of poor infrared energy reflectance, it is desirable to increase the infrared energy reflectance, and increase the percentage of energy reflected, i.e., reflectance efficiency, of the enamel composition. This increase is done by, at least, providing an optimum volume fraction of high reflective infrared reflecting metal oxide particles in the high reflective infrared reflecting enamel composition, and also engineering a high reflective infrared reflecting metal oxide particle size to an optimum range, for example, within a range between about $\frac{1}{3}(\lambda)$ to about $\frac{1}{2}(\lambda)$ of the mean wavelength ($\lambda$) of a desired radiation.

Infrared reflectance for conventional enamel compositions is about $\leq 70\%$. This low reflectance is not efficient nor effective for infrared heating because too much energy is wasted with a relfectance less than about 70%. It has been determined that an efficient and effective reflectance value is at least about 80% so as to be desirable for efficient and effective infrared heating. More preferred is to have a reflectance value of greater than about 85% or more. Even more preferred is to have a reflectance of about 90% or more.

Enamel compositions comprise at least a frit or glass, including oxides; mill additives, such as clay; and other materials, for color, appearance and other desired features. The oxides naturally occur in the frit. Moreover, the oxides may also be added during preparation of the enamel. These oxides that naturally occur, and that can be added, include, but are not limited to, $Na_2O$, $K_2O$, $Si_2O$ and $TiO_2$.

Conventional enamel compositions normally have a white coloration and comprise titania, $TiO_2$, which in part provides its white coloration and appearance. The $TiO_2$ in conventional enamel compositions is normally Anatase $TiO_2$, compared to Rutile $TiO_2$ (which will be discussed in more detail below). Anatase $TiO_2$ is normally precipitated out of an enamel composition at a firing condition, for example in a range between about 1500 to about 1550° F. for a time period of about 3 to about 10 minutes. Anatase $TiO_2$ has a particle size less than about 0.5 $\mu$m, and normally only in a range of about 0.2 $\mu$m to 0.3 $\mu$m. At this particle size, the Anatase $TiO_2$ is optimum for the desirable white color.

While a conventional enamel containing Anatase $TiO_2$ reflects some heat, the conventional enamel reflects less than 70% of infrared energy, and is not efficient, and therefore undesirable, to reflect infrared energy to heat food. Anatase $TiO_2$ has a reflective index only in the range between about 2.4 to about 2.5 and a particle size only in the range between about 0.2 $\mu$m to about 0.3 $\mu$m. Therefore, an enamel composition with Anatase $TiO_2$ does not possess high reflective infrared reflecting metal oxide particles having a sufficient size and volume fraction to efficiently reflect infrared energy for heating.

However, Rutile $TiO_2$ has a reflective index in the range between about 2.65 to about 2.75 with a particle size of up to about 2.75 $\mu$m. Accordingly, the Rutile $TiO_2$ has a higher reflectance of infrared energy, and thus will act as suitable high reflective infrared reflecting metal oxide particles for use in enamels, when compared to Anatase $TiO_2$. Thus, since it has been determined that it is desirable to reflect more infrared energy by increasing particle size in an enamel, it is desirable to provide Rutile $TiO_2$ in an enamel to efficiently and effectively reflect infrared energy for heating.

An enamel composition that is heated for a longer time and at a higher temperature than for normal enamels changes normally occurring Anatase $TiO_2$ into the desirable high reflective infrared reflecting Rutile $TiO_2$. This process recrystallizes the $TiO_2$ from Anatase $TiO_2$ to Rutile $TiO_2$. The $TiO_2$ particles in an enamel composition are "grown" or recrystallized to Rutile $TiO_2$ by heating for a longer time and at a higher temperature than for normal enamels, i.e., at temperatures greater than about 1500° F. for longer than about 3 to about 10 minutes. Alternatively, the heating temperature can be increased to somewhat higher than about 1500° F., while the heating time need not be increased. In other words, with an increase of one of the heating time and temperature, the other of the heating time and temperature need not be increased.

A high reflective infrared reflecting material composition comprises an enamel coating over at least one inner surface of an oven, where the surface has been provided with a ground coat. In particular, the high reflective infrared reflecting enamel composition comprises a layer of high reflective infrared reflecting metal oxide, for example titanium oxide ($TiO_2$), which enhances the reflectivity of the enamel when incorporated into the ground coat. The reflectivity of the high reflective infrared reflecting enamel composition is enhanced because of a high volume of titania and by the amount and size of the recrystallized Rutile $TiO_2$ particles, as described hereinafter.

The following description describes an enamel composition with $TiO_2$, as the metal oxide. However, this description is only exemplary and is not meant to limit the invention in any way. Other metal oxides, which are high reflective infrared reflecting oxides, are within the scope of the invention.

Figure 2:
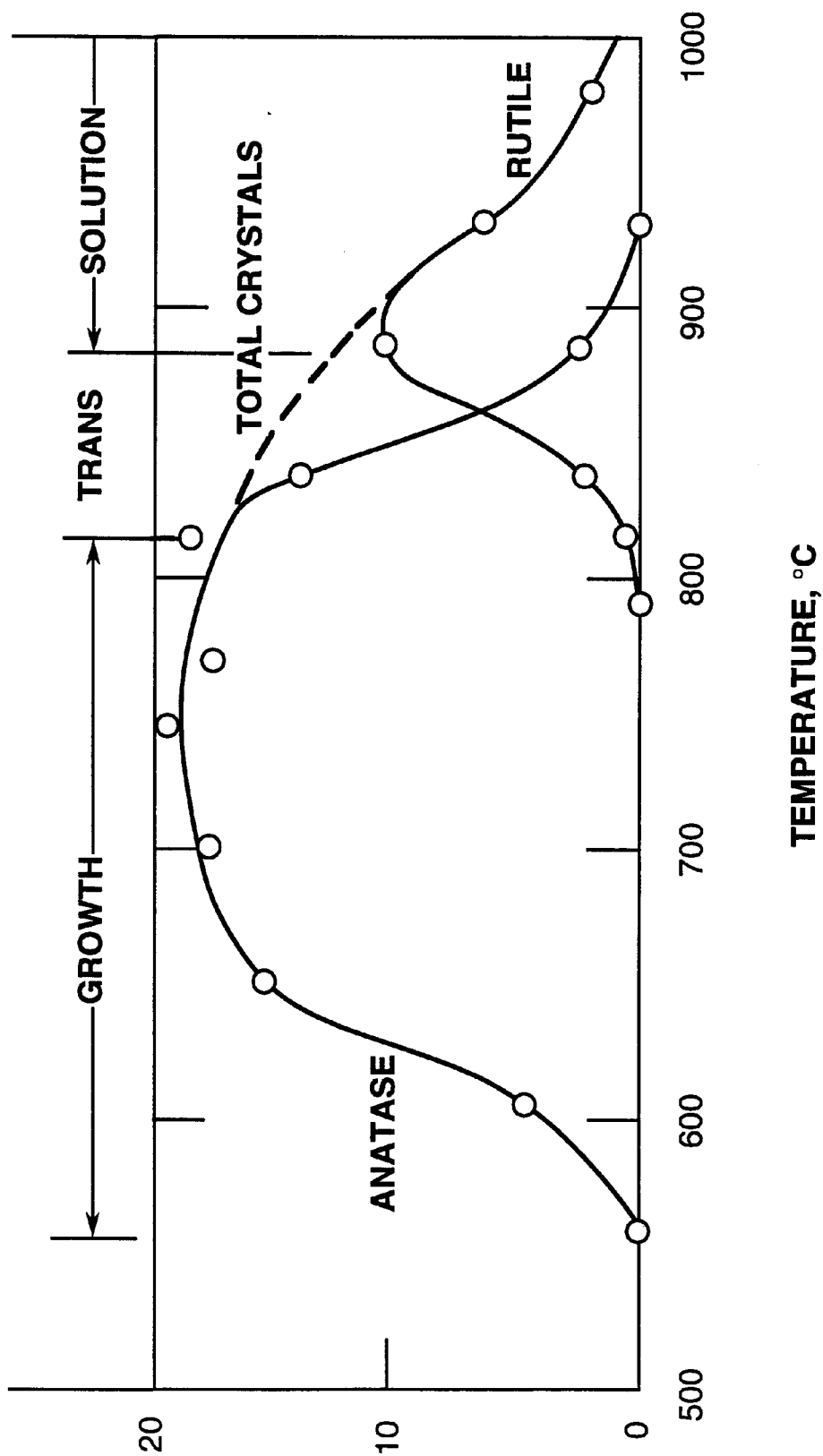
FIG. 2 is a graph illustrating crystal percentage versus temperature for the crystallization of $TiO_2$ in an enamel composition.

FIG. 2 illustrates a graph of weight percent of crystallized $TiO_2$ versus temperature for a phosphate-stabilized (4% $P_2O_5$) enamel. The graph illustrates the conversion of Anatase $TiO_2$ to Rutile $TiO_2$. As is illustrated by the graph, the crystallized Rutile $TiO_2$ has a smaller weight percentage compared to the Anatase $TiO_2$. While at first glance this relationship may appear to be contrary to Rutile $TiO_2$ having a higher infrared reflectance, as discussed above the Rutile $TiO_2$ has a larger particle size and higher refractive index than Anatase $TiO_2$.

An infrared reflecting enamel composition, as embodied in the invention, comprises Rutile $TiO_2$ particles dispersed within a binder or binder phase, which is provided by the enamel composition itself. The Rutile $TiO_2$ particles, which will be recrystallized from Anatase $TiO_2$ and grown by heating, enhance the reflectivity of the high reflective infrared reflecting enamel composition. While there may be some remaining un-recrystallized Anatase $TiO_2$ particles, the majority of the $TiO_2$ in the enamel is recrystallized by heating to Rutile $TiO_2$.

One exemplary method for manufacturing the infrared reflecting enamel composition, will now be described with reference to FIGS. 3–6. In these figures, an infrared reflecting enamel composition is formed by placing a ground coat of enamel 2, for example such as formed as a powder coating by electrocoating according to an electrostatic process, on a substrate 1. The substrate 1 may be formed from any appropriate material usable as an internal surface of an infrared heating oven, such as but not limited to aluminum, steel, and alloys thereof. A layer of titania powder 30 is then placed on the ground coat 2, as illustrated in FIG. 4.

The substrate 1, along with the ground coat 2 and titanium powder layer 30, is then heated for a first heating at a first predetermined temperature. This first heating softens the ground coat 2 and causes the ground coat 2 flow and spread over the substrate 1. The ground coat 2, upon cooling, then forms a densified, hardened layer.

The first heat treating also causes a majority of the $TiO_2$ particles 3 of the titanium powder layer 30 to sink into and become embedded in the ground coat 2 at least at its top surface while the ground coat 2 is soft and flows, as illustrated in FIG. 5. More preferable, the first heat treating causes a majority of the $TiO_2$ particles to sink into and become embedded in the ground coat 2 at least below the top surface of the ground coat 2. This forms a heat treated infrared reflecting enamel composition 5.

Figure 6:
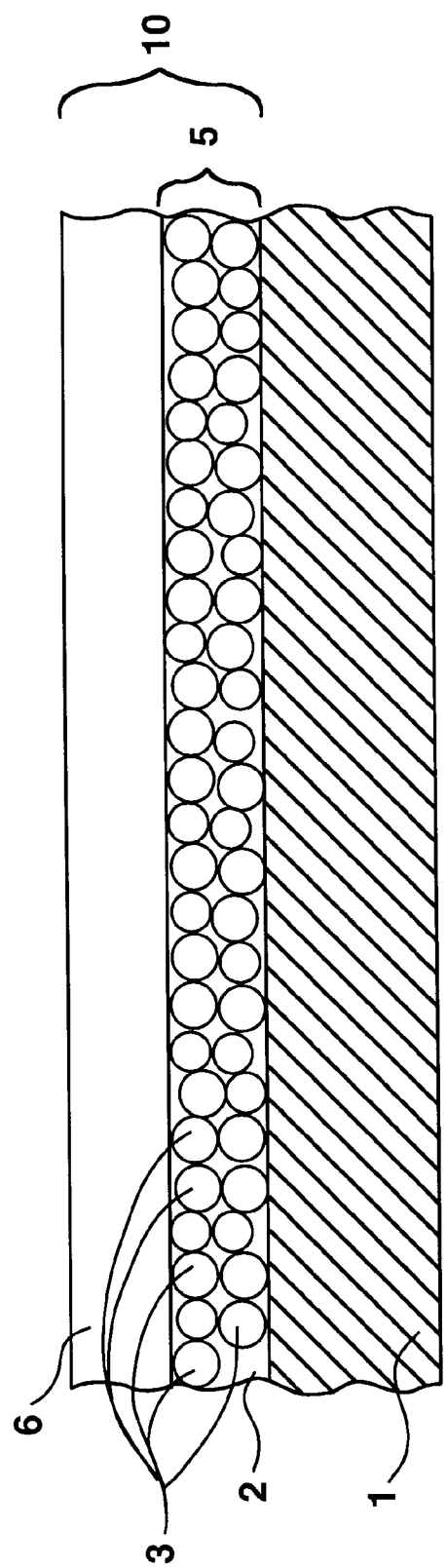
FIG. 6 is side cross-sectional view of FIG. 4 with a layer of enamel after heat treating.

A suitable white enamel 6, for example Q0808A (Ferro Corporation) that is essentially a glass enamel composition, is then covered on the heat treated infrared reflecting enamel composition 5, as illustrated in FIG. 6. The enamel 6 is formed with a suitable thickness in a range between about 5.0 mils to about 30.0 mils. More preferred, the suitable thickness is in a range between about 5.0 mils to about 20.0 mils. Even more preferred, the suitable thickness is in a range between about 7.0 mils to about 12 mils, for example but not limited to, 8 mils. The enamel 6 and the heat treated infrared reflecting enamel composition 5 forms an enamel assembly 10.

The enamel assembly 10 is then heat treated, for a second time, at a suitable predetermined temperature, for example, above a range between about 1550° F. to about 1600° F., for an appropriate time, for example, greater than a range between about 3–10 minutes, to soften layers the enamel assembly 10. The enamel 6 will soften and flow to provide a glazed and recrystallized dense surface of the infrared reflecting enamel composition 5. This second heat treatment is done at a sufficient temperature and for a time period to recrystallize $TiO_2$ particles from Anatase $TiO_2$ to Rutile TiO$_2$. Accordingly, the high reflective infrared reflecting enamel composition will then comprise high reflective infrared reflecting metal oxide particles, i.e., Rutile TiO$_2$.

If the heating temperature for the second heating is somewhat higher than a range between about 1500° F. to about 1550° F., the heating time need not be increased. Alternatively, if the heating time is somewhat longer than a range between about 3 and about 10 minutes, the heating temperature need not be increased. In other words, with an increase of one of the heating time and temperature, the other of the heating time and temperature need not be increased.

The high infrared reflectivity value of the resultant enamel assembly 10 is preferably at least about 80%, even more preferably greater than at least about 85% and even still more preferably greater than at least about 90%. Accordingly, the substrate 1 with the high reflective infrared reflecting enamel assembly 10 will provide a suitable, efficient and effective infrared reflecting surface for use in an infrared heating apparatus.

As embodied in an aspect of the invention, some Rutile TiO$_2$ particles, comprising a size in a range between about 0.2 and 2.0 μm, are included in the ground coat enamel. The amount of Rutile TiO$_2$ particles in the ground coat is preferably in a range of about to 15 wt %. The Rutile TiO$_2$ particles in the ground coat provide scattering of energy from inside the ground coat. Further, a layer of titania TiO$_2$ may be placed over the ground coat. The layer of TiO$_2$ will be mix with and disperse into the ground coat during the first heat treatment, as discussed above.

Figure 7:
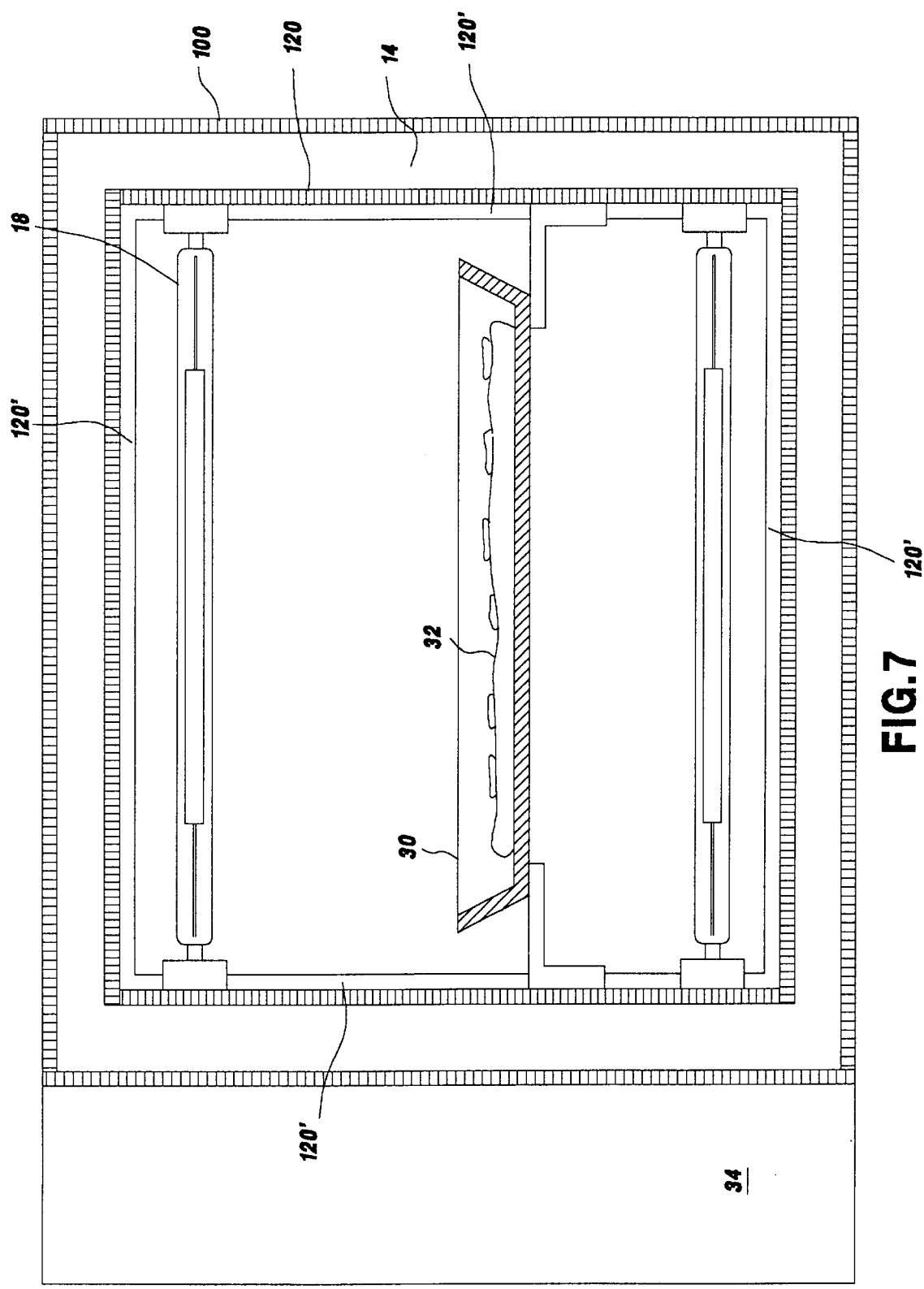
FIG. 7 is a front cross-sectional illustration of an oven with an enamel composition coating.

FIG. 7 is a front cross-sectional illustration of the preferred embodiment of the present invention. The oven in FIG. 7 includes an outer enclosure 100. The enclosure has an inner wall 120 disposed within to the outer wall 100. Ordinarily, an insulating layer 14 is formed between the outer enclosure 100 and the inner wall 120. Because of the inherent speed of the cooking cycle obtained with an oven comprising a coating 121 of high reflective infrared reflecting enamel as embodied in the invention, the insulating layer 140 can be formed of any suitable insulating material. Alternatively because of the speed of the cooking cycle, the insulating layer 140 can be a layer of air.

The energy for cooking is supplied by the lower radiation heating lamps 16 and the upper radiation heating lamps 18. These lamps are generally any of the quartz body, tungsten-halogen lamps commercially available, e.g., 1.5 KW 208 V quartz-halogen lamps. The oven can utilize any number of lamps. At least one inner surface of the inner walls 120 is provided with an high reflective infrared reflecting enamel composition coating 121 as embodied in the invention, to achieve an efficient and effective infrared energy reflecting surface. Thus, the surface will effectively disperse and diffuse infrared energy to the food to be heated. A control circuit 34 controls the operation of lamps 16 and 18.

The lamps 16 and 18 produce very high intensity radiation, both visible and infrared. The radiant energy from the lamps 16 and 18 radiates from each bulb in all directions. A portion of the energy radiates directly onto the food item 32. The remainder of the energy will be diffusely reflected off the high reflective infrared reflecting enamel composition coating 121 on the metal inner wall 120 and diffusely impinge on a food item 32 for a more efficient heating.

While the embodiments described herein are preferred, it will be appreciated from the specification that various combinations of elements, variations or improvements the rein may be made by those skilled in the are that are within the scope of the invention.

What is claimed is:

1. A method for manufacturing a high reflective infrared energy reflecting enamel composition, comprising:

forming a ground coat of enamel on a substrate;

providing a layer of titania powder on the ground coat, where the layer of titania powder contains TiO$_2$ particles; and heating the ground coat and the substrate, wherein the heating softens the ground coat forms a dense layer on the substrate and embeds the TiO2 particles in the ground coat.

2. A method according to claim 1, further comprising:

providing an cover enamel on the ground coat and TiO$_2$ particles after the heating the ground coat and the substrate.

3. A method according to claim 2, further comprising:

heat treating the ground coat, the substrate and the cover enamel for a predetermined temperature and time to soften the ground coat, provide a glazed recrystallized dense surface, and recrystallize the TiO$_2$ particles from Anatase TiO$_2$ to Rutile TiO$_2$.

4. A method according to claim 3, wherein the layer of titania powder comprises Rutile TiO$_2$.

5. A method according to claim 2, wherein the cover enamel comprises a glass enamel composition.

6. A method according to claim 2, wherein the providing the cover enamel on the treated infrared reflecting enamel composition comprises;

forming the cover enamel with a predetermined thickness.

7. A method according to claim 6, wherein the predetermined thickness is in a range between about 5 to about 30 mils.

8. A method according to claim 1, wherein the providing a layer of titania powder on the ground coat comprises electrocoating the layer of titania powder.

9. A high reflective infrared energy reflecting enamel composition, comprising:

ground coat of enamel; and

Rutile TiO$_2$ particles in the ground coat of enamel; wherein the Rutile TiO$_2$ particles are embedded in the ground coat of enamel by heating the ground coat, and the infrared reflecting enamel composition has an infrared energy reflectance value of at least 80%.

10. A composition according to claim 9, wherein the Rutile TiO$_2$ particles are provided from a layer of titania powder provided on the ground coat.

11. A composition according to claim 10, further comprising:

a substrate, the ground coat being provided on the substrate;

wherein the ground coat comprises a dense layer on the substrate, and the ground coat and the substrate have been softened to form a dense layer on the substrate.

12. A composition according to claim 9, wherein the infrared reflecting enamel composition has an infrared energy reflectance value of at least 85%.

13. A composition according to claim 9, wherein the infrared reflecting enamel composition has an infrared energy reflectance value of at least 90%.

14. A composition according to claim 9, further comprising:

a cover enamel provided on the infrared reflecting enamel composition.

15. A composition according to claim 14, wherein the cover enamel comprises a glass enamel composition.

16. A composition according to claim 14, wherein the cover enamel is provided with a predetermined thickness, the predetermined thickness being in a range between about 5.0 to about 30.0 mils.

17. A composition according to claim 16, wherein the predetermined thickness is about 8.0 mils.

18. A composition according to claim 9, further comprising a glazed recrystallized dense surface.

19. A composition according to claim 9, wherein the embedded Rutile $TiO_2$ particles have been transformed from an Anatase $TiO_2$ by heating.

20. A composition according to claim 9, wherein the Rutile $TiO_2$ particles have a size in a range between about $\frac{1}{3}(\lambda)$ to about $\frac{1}{2}(\lambda)$, where $\lambda$ is a desired wavelength of infrared energy, and a volume fraction of the $TiO_2$ particles is in a range between about 15% to about 40%.

21. An oven comprising:

at least one infrared energy source;

at least one internal surface; and a high reflective infrared reflecting enamel composition on at least one of said at least one internal surface, wherein the high reflective infrared reflecting enamel composition comprises:

a ground coat of enamel provided on said at least one internal surface; and

Rutile $TiO_2$ particles in the ground coat of enamel, the Rutile $TiO_2$ particles being embedded in the ground coat of enamel by heating the ground coat and the at least one internal surface, and the infrared reflecting enamel composition has an infrared energy reflectance value of at least 80%.

* * * * *